US012605667B2

(12) United States Patent
    Jolliffe

(10) Patent No.: US 12,605,667 B2
(45) Date of Patent: Apr. 21, 2026

(54) FILTER ASSEMBLY AND FOLDABLE FILTER BANK

(71) Applicant: Carrier Corporation, Palm Beach Gardens, FL (US)

(72) Inventor: Chrystal Jolliffe, London, OH (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 337 days.

(21) Appl. No.: 18/446,364

(22) Filed: Aug. 8, 2023

(65) Prior Publication Data

US 2024/0082774 A1      Mar. 14, 2024

Related U.S. Application Data

(60) Provisional application No. 63/371,442, filed on Aug. 15, 2022.

(51) Int. Cl.
    *B01D 46/52*      (2006.01)
    *B01D 46/00*      (2022.01)

(52) U.S. Cl.
    CPC ....... *B01D 46/521* (2013.01); *B01D 46/0016* (2013.01)

(58) Field of Classification Search
    None
    See application file for complete search history.

(56) References Cited

U.S. PATENT DOCUMENTS

| | | | | |
|---|---|---|---|---|
| 3,177,637 | A * | 4/1965 | Davis | B01D 46/523 55/497 |
| 3,470,680 | A * | 10/1969 | Avera | B01D 46/121 55/497 |
| 3,494,113 | A * | 2/1970 | Kinney | B01D 46/0005 55/497 |
| 5,223,011 | A * | 6/1993 | Hanni | B01D 46/10 55/497 |
| 6,113,674 | A * | 9/2000 | Graham | F24F 3/167 96/138 |
| 6,447,566 | B1 * | 9/2002 | Rivera | B01D 46/121 55/497 |
| 6,485,538 | B1 | 11/2002 | Toyoshima | |
| 7,048,501 | B2 * | 5/2006 | Katayama | B01D 46/10 415/121.2 |
| 7,320,720 | B2 * | 1/2008 | Ticknor | B01D 46/10 55/483 |

(Continued)

FOREIGN PATENT DOCUMENTS

| | | | | |
|---|---|---|---|---|
| CN | 101888892 A | * | 11/2010 | ........... B01D 46/121 |
| DE | 102007016161 A1 | * | 10/2008 | ........... B01D 46/521 |
| JP | 4834594 B2 | | 12/2011 | |

*Primary Examiner* — Brit E. Anbacht
(74) *Attorney, Agent, or Firm* — Souad Hakim

(57) ABSTRACT

A foldable filter bank and a filter assembly for a filter cabinet is disclosed. The filter cabinet is adapted to accommodate and hold the filter bank in a deployed state. The filter assembly comprises a foldable filter bank comprising a plurality of filter-media packs, where adjacent filter-media packs among the plurality of filter-media packs are hingedly coupled to each other using at least one coupling element, where the filter bank has one or more of a deployed state, a folded state, and an extended state. The deployed state corresponds to a pleated formation of the filter bank, in which adjacent filter-media packs are oriented at non-parallel angles.

20 Claims, 7 Drawing Sheets

(56) References Cited

U.S. PATENT DOCUMENTS

| | | | |
|---|---|---|---|
| 7,410,520 B2 * | 8/2008 | Nowak | B01D 46/0016 |
| | | | 55/497 |
| 7,931,726 B2 * | 4/2011 | Karlsson | B01D 46/10 |
| | | | 55/482 |
| 7,947,101 B2 * | 5/2011 | Devine | B01D 46/522 |
| | | | 55/497 |
| 8,021,454 B2 * | 9/2011 | Braunecker | B01D 46/0091 |
| | | | 55/483 |
| 8,425,644 B2 | 4/2013 | Sundvik et al. | |
| 8,491,689 B2 | 7/2013 | Duffy et al. | |
| 9,028,578 B2 * | 5/2015 | Chin | B01D 46/0002 |
| | | | 55/483 |
| 9,205,359 B2 | 12/2015 | Kelmartin et al. | |
| 9,623,356 B2 | 4/2017 | Gorman | |
| 10,675,580 B1 * | 6/2020 | Wyluda | B01D 46/0005 |
| 11,207,629 B2 | 12/2021 | Green et al. | |
| 2011/0252759 A1 | 10/2011 | Nicholas | |
| 2017/0274308 A1 * | 9/2017 | Williams | B01D 46/521 |
| 2021/0046413 A1 * | 2/2021 | Ouyang | F02M 35/02441 |

* cited by examiner

500

504-1    504-2    504-3    504-4    504-1    504-N

506

502

600

100

506    500

800

802

804

900

FILTER ASSEMBLY AND FOLDABLE FILTER BANK

CROSS-REFERENCE TO RELATED APPLICATION

This patent application claims the benefit of priority of U.S. Provisional Patent Application No. 63/371,442, filed on Aug. 15, 2022.

BACKGROUND

This invention relates to the field of air filters, and more particularly, to a filter assembly Filters or filter assemblies used in the industry are generally made from a bank of filter-media packs typically housed in a rigid frame (filter cabinet) for air filtering applications. The filter-media pack or filter bank may be completely sealed in the frame to ensure filtering efficiency. Generally, high-efficiency air particulate (HEPA) filters are chosen as the filter-media pack for existing filter banks, as HEPA filters may be pleated to increase their surface area and to lower pressure drop. Existing filter-media packs and filter banks, while generally adequate, need improvements in order to improve efficiency. There is, therefore, a need to improve the efficiency of the filter-media packs of the filter bank and improve filter pressure drop as well. Additionally, there is a need for such a filter assembly with an improved filter pressure drop which works for filter-media packs other than HEPA filters.

SUMMARY

Described herein is a foldable filter bank with improved airflow and lower filter pressure drop. The filter bank comprises multiple filter-media packs in which adjacent filter-media packs are hingedly coupled to each other using at least one coupling element, which facilitates configuring the filter bank between one or more of a deployed state, a folded state, and an extended state.

In one or more embodiments, the deployed state comprises adjacent filter-media packs oriented (in a V-shape arrangement) at non-parallel angles, thereby forming a zig-zag arrangement of the filter-media packs. The zig-zag arrangement increases the surface area of the filter bank and allows maximum air to flow through the filter bank.

In one or more embodiments, the folded state comprises surfaces of two adjacent filter-media packs in contact, thereby making the filter bank compact in size. Further, the extended state comprises the filter-media packs oriented coaxially with each other.

In one or more embodiments, each of the filter-media packs comprises a first surface, and a second surface opposite to the first surface, wherein the first surface corresponds to an upstream side of the filter bank and the second surface corresponds to a downstream side of the filter bank. The coupling elements are disposed alternately on the upstream side and the downstream side of the filter bank, which results in the formation of non-parallel angles between adjacent filter-media packs when the filter bank is in a deployed state.

In one or more embodiments, the coupling element on the upstream side is at least partially attached to the first surface on connecting ends of the corresponding adjacent filter-media packs, and wherein the coupling element on the downstream side is at least partially attached to the second surface on connecting ends of the corresponding adjacent filter-media packs.

In one or more embodiments, each coupling element comprises a strip of flexible material, glue beads, edge bands, adhesive, or a combination thereof.

In one or more embodiments, the flexible material is porous to facilitate airflow therethrough.

In one or more embodiments, the glue beads are used at a downstream edge of a pleat between the adjacent filter-media packs on an upstream side of the filter bank, to seal the two-adjacent filter-media packs.

In one or more embodiments, the glue beads are used to close a pleat between the adjacent filter-media packs on a downstream side of the filter bank, and wherein a pleat tip created between the adjacent filter-media packs on an upstream side of the filter bank is left open to allow air to pass into corresponding filter-media pack.

Also described herein is a filter assembly for a filter cabinet is disclosed. The filter assembly comprises a foldable filter bank comprising a plurality of filter-media packs, wherein adjacent filter-media packs among the plurality of filter-media packs are hingedly coupled to each other using at least one coupling element, wherein the filter has one or more of a deployed state, a folded state, and an extended state, and the deployed state corresponds to a pleated formation of the filter bank, in which adjacent filter-media packs orient at a non-parallel angle to form a zig-zag arrangement of the plurality of filter-media packs.

In one or more embodiments, the filter cabinet comprises a support structure adapted to hold and support the filter bank thereon, wherein the support structure is adapted to slide within a housing of the filter cabinet.

In one or more embodiments, the support structure is a wired frame comprising: a bottom at an air exiting side of the filter assembly, an open top at an air entering side of the filter assembly, and a set of partition walls extending perpendicularly from the bottom of the wired frame such that one or more compartments are formed therebetween.

In one or more embodiments, the set of partition walls associated with the support structure are adapted to accommodate and engage with the coupling point between adjacent filter-media packs when the filter bank is in the deployed state.

In one or more embodiments, the filter assembly comprises a retainer removably attached to the coupling elements on a downstream side of the filter bank, the retainer adapted to hold the two-adjacent filter-media packs at the non-parallel angle in the deployed state and restrict movement of the filter bank beyond the deployed state.

In one or more embodiments, the retainer comprises a first leg, and a second leg inclined at the non-planar angle with the first leg, wherein the first leg is attached to one of the two-adjacent filter-media packs and the second leg is attached to the other adjacent filter-media pack.

In one or more embodiments, the retainer is a plastic extrusion having the first leg and the second leg making the non-parallel angle of 90 degrees such that the two-adjacent filter-media packs remain oriented in a V-shape arrangement.

In one or more embodiments, the filter bank comprises an engaging element configured at the ends of the filter bank and adapted to engage with the extreme ends of the filter cabinet, which locks the filter-media packs in the filter cabinet.

In one or more embodiments, the filter bank in the deployed state is sealed within the filter cabinet using a sealing element selected from a group comprising a filter media, and insulating material comprising polyester or fiberglass.

In one or more embodiments, the filter bank in the deployed state is sealed within the filter cabinet through a friction fit between the pleat tips of the filter bank and an inner surface of the filter cabinet.

The foregoing summary is illustrative only and is not intended to be in any way limiting. In addition to the illustrative aspects, embodiments, and features described above, further aspects, embodiments, features, and techniques of the invention will become more apparent from the following description taken in conjunction with the drawings.

BRIEF DESCRIPTION OF THE DRAWINGS

The accompanying drawings are included to provide a further understanding of the subject disclosure of this invention and are incorporated in and constitute a part of this specification. The drawings illustrate exemplary embodiments of the subject disclosure and, together with the description, serve to explain the principles of the subject disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the subject disclosure as defined by the appended claims.

Various terms are used herein. To the extent a term used in a claim is not defined below, it should be given the broadest definition persons in the pertinent art have given that term as reflected in printed publications and issued patents at the time of filing.

In the specification, reference may be made to the spatial relationships between various components and to the spatial orientation of various aspects of components as the devices are depicted in the attached drawings. However, as will be recognized by those skilled in the art after a complete reading of the subject disclosure, the components of this invention. described herein may be positioned in any desired orientation. Thus, the use of terms such as "above," "below," "upper," "lower," "first", "second" or other like terms to describe a spatial relationship between various components or to describe the spatial orientation of aspects of such components should be understood to describe a relative relationship between the components or a spatial orientation of aspects of such components, respectively, as the filter-media packs, filter bank, frame structure of the filter assembly, and corresponding components, described herein may be oriented in any desired direction.

The coupling elements include, but are not limited to, heat reactivating glue beads, and/or edge banding. These elements are used at the downstream edge of the pleat between the adjacent filter-media packs on an upstream side of the filter bank, to seal the two-adjacent filter-media packs. In addition, coupling elements are also used to close the pleat between the adjacent filter-media packs on the downstream side of the filter bank. However, a pleat tip created between the adjacent filter-media packs on an upstream side of the filter bank is left open to allow air to pass into the corresponding filters-media packs, which allows air to flow through the filter assembly and also improves filter pressure drop.

The term "hingedly coupled" used in this disclosure refers to the coupling of one end of the filter-media packs to one end of another filter-media pack such that the free ends of the two filter-media packs can freely move away or towards each other.

Figures 1A, 1B, 1C:
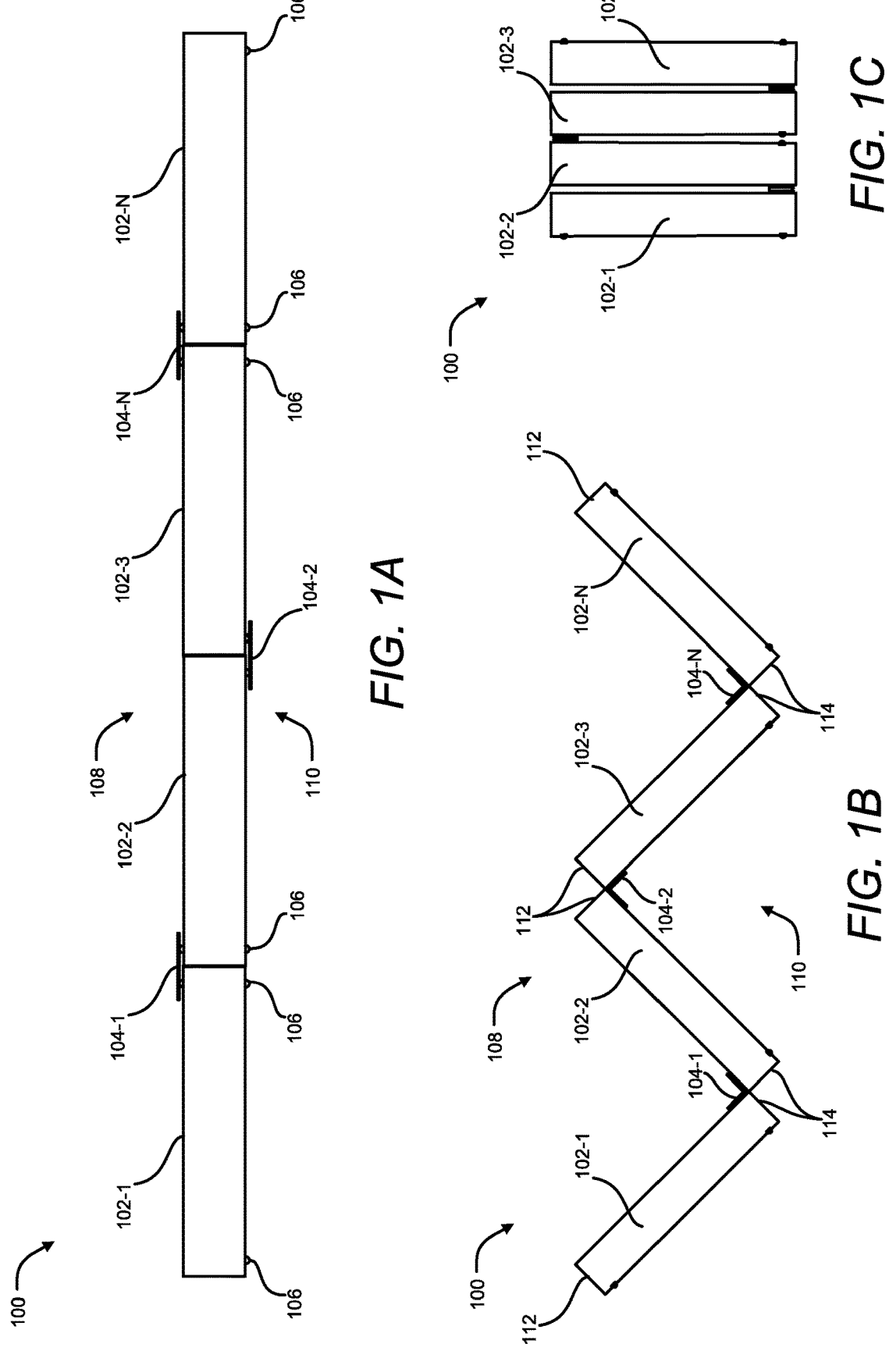
FIG. 1A is a schematic diagram illustrating an exemplary embodiment of the foldable filter bank in an extended state in accordance with the invention.
FIG. 1B is a schematic diagram illustrating an exemplary embodiment of the foldable filter bank in a deployed state.
FIG. 1C is a schematic diagram illustrating an exemplary embodiment of the foldable filter bank in a folded state.

Referring to FIGS. 1A to 1C, exemplary views of the foldable filter bank 100 (also referred to as filter bank 100, herein) for a filter assembly, in an extended state, a deployed state, and a folded state, respectively, are illustrated. The filter assembly includes the filter bank 100 that includes a plurality of filter-media packs 102-1 to 102-N (collectively referred to as filter-media packs 102, herein), where each filter-media pack 102 has a first surface corresponding to an upstream side 108 of the filter bank 100, and a second surface opposite to the first surface, which corresponds to a downstream side 110 of the filter bank 100. Air may enter the filter bank 100 through the upstream side 108 and exit through the downstream side 110, however, the filter bank 100 may also allow air to enter through the downstream side 110 and exit through the upstream side 108. The adjacent filter-media packs among the plurality of filter-media packs 102 are hingedly coupled to each other, which facilitates configuring the filter bank 100 between one or more of the deployed state, the folded state, and the extended state. For instance, one end of the filter-media pack 102-1 may be hingedly coupled to one end of the filter-media pack 102-2. Further, the other end of the filter-media pack 102-2 may be hingedly coupled to one end of the filter-media pack 102-3. Furthermore, the other end of the filter-media pack 102-3 may be hingedly coupled to one end of the filter-media pack 102-N.

Figure 2:
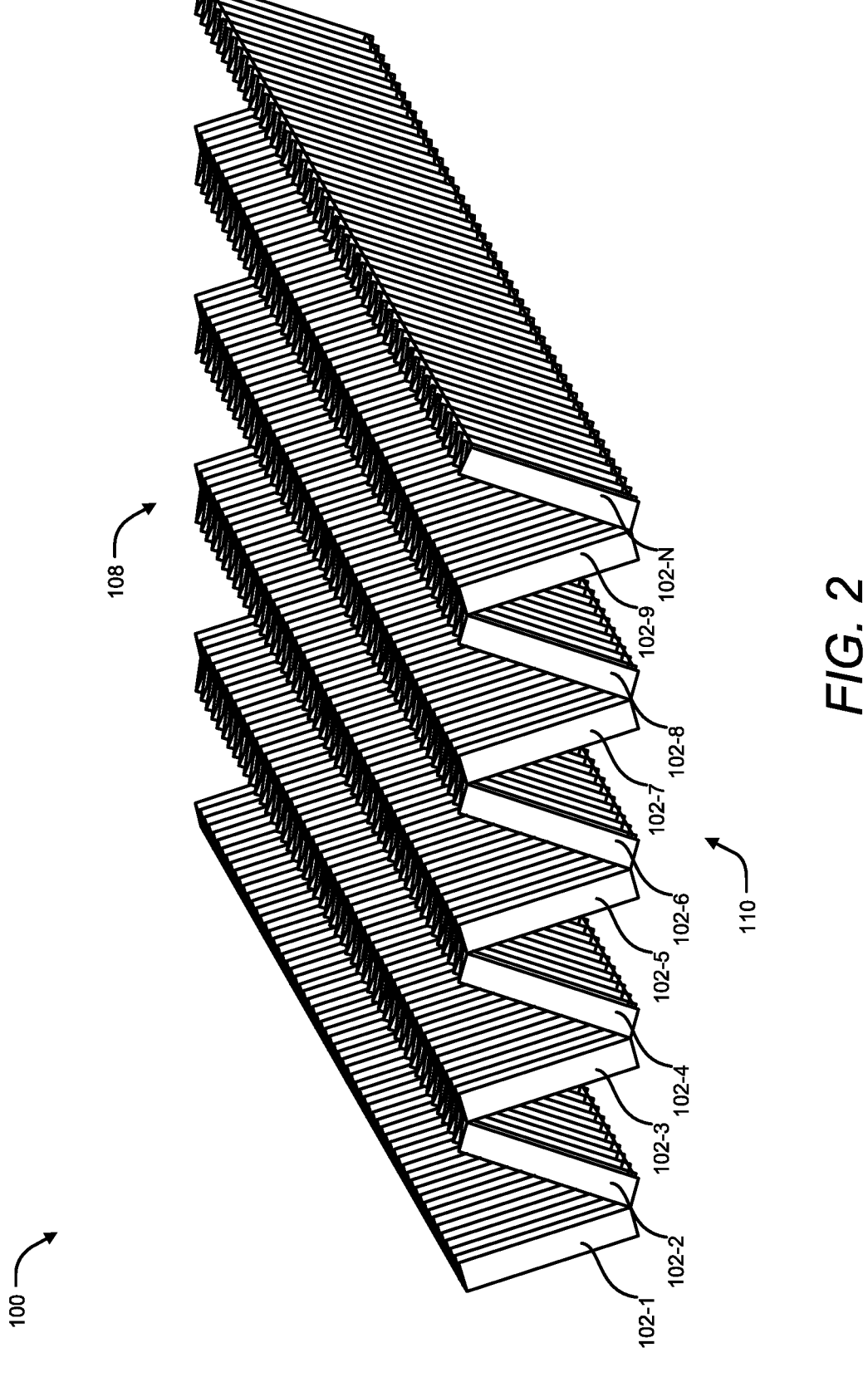
FIG. 2 is an isometric view of the foldable filter bank having ten filter-media packs in a zig-zag arrangement in the deployed state in accordance with an exemplary embodiment of the invention.

FIGS. 1A to 1C, illustrates exemplary front view of the foldable filter bank 100 having four filter-media packs 102-1 to 102-N, in an extended state, deployed state, and folded state, respectively, in an exemplary embodiment of the invention. FIG. 2 illustrates an isometric view of the foldable filter bank having ten filter-media packs 102-1 to 102-N in a zig-zag arrangement in the deployed state, in another exemplary embodiment of the invention.

In the deployed state as shown in FIGS. 1B and 2, the filter-media packs 102 create a pleated formation, where adjacent filter-media packs are oriented at non-parallel angles and remain oriented in a V-shape arrangement, thereby forming a zig-zag arrangement of the plurality of filter-media packs 102-1 to 102-N. The filter assembly can be accommodated or secured in a filter cabinet when the filter bank 100 is in the deployed state. In the extended state as shown in FIG. 1A, the filter-media packs 102-1 to 102-N orient coaxially with each other. Further, in the folded state as shown in FIG. 1C, surfaces of the two adjacent filter-media packs come in contact or in proximity to each other thereby reducing the overall size of the filter bank 100, which allows easier storage and transportation of the folded filter bank.

The adjacent filter-media packs are hingedly coupled using at least one coupling element 104-1 to 104-N (collectively referred to as coupling elements 104, herein). The coupling elements 104 are configured alternately on the upstream side 108 and the downstream side 110 of the filter bank 100 as shown in FIG. 1A, which results in the formation of a zig-zag arrangement of the plurality of filter-media packs 102-1 to 102-N when the filter bank 100 is in the deployed state as shown in FIG. 1B. The coupling elements on the upstream side 108 of the filter bank 100 remain at least partially attached to the first surface on connecting ends of the corresponding adjacent filter-media packs. Further, the coupling element 104-2 on the downstream side 110 remains at least partially attached to the second surface on connecting ends of the corresponding adjacent filter-media packs. For instance, as shown in FIGS. 1A and 1B, a first coupling element 104-1 is attached to the first surface on connecting ends of the adjacent filter-media packs 102-1, 102-2 on the upstream side 108. Further, a second coupling element 104-2 is attached to the second surface on connecting ends of the adjacent filter-media packs 102-2, 102-3 on the downstream side 110. Similarly, a third coupling element 104-N is attached to the first surface on connecting ends of the adjacent filter-media packs 102-3, 102-N on the upstream side 108.

It should be understood that, although the filter bank or filter assembly 100 shown in various embodiments and drawings of this invention has four or ten filter-media packs, however, a variety of quantities of filter-media packs may be used, and all such embodiments are well within the scope of the invention. For example, the filter bank may have three or five filter-media packs wherein adjacent pairs of filter-media packs remain in a V-shape configuration in the deployed state, thereby forming the zigzag configuration of the filter bank. Alternatively, only a pair of filter-media packs may be implemented, which may be making a non-parallel angle therebetween to form the V-shape configuration in the deployed state. Many such variations may also be implemented as required. Accordingly, a variety of quantities of coupling elements may be used based on the number of filter-media packs being employed, and all such embodiments are well within the scope of the invention.

Figure 3A:
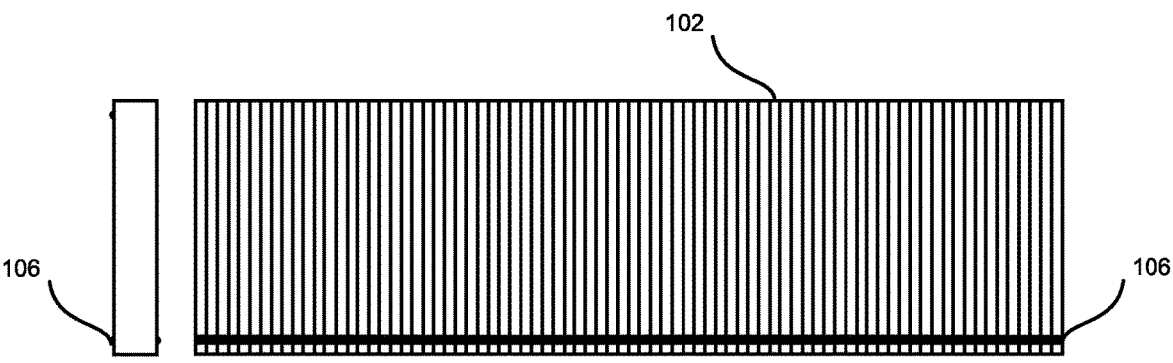
FIG. 3A is a schematic diagram illustrating an air entering side of a single filter-media pack used in the filter bank of FIG. 2.
Figure 3B:
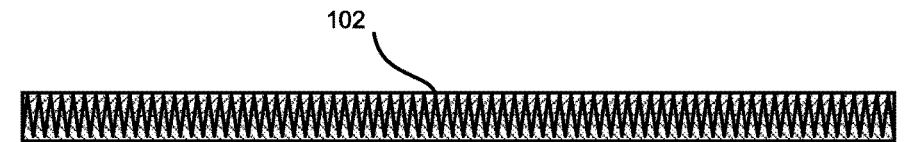
FIG. 3B is a schematic diagram illustrating a side section view of a single filter-media pack used in the filter bank of FIG. 2.
Figure 3C:
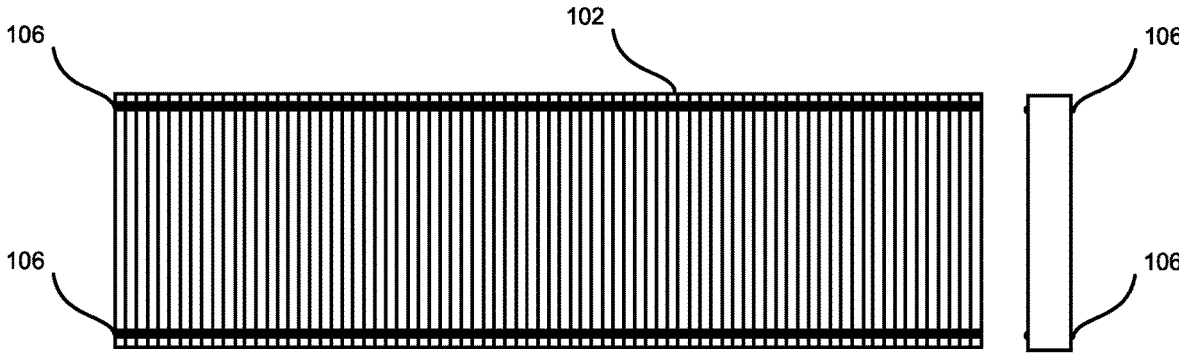
FIG. 3C is a schematic diagram illustrating an air exiting side of a single filter-media pack used in the filter bank of FIG. 2.

The coupling element 104 used in this invention may include a strip of flexible material (also designated as 104, herein), glue beads 106, edge bands, adhesive, and combinations thereof. Similarly, other types of coupling elements may also be used to hingedly couple the adjacent filter-media packs and all such embodiments are well within the scope of the invention. However, coupling elements 104 are chosen such that the pleat 114 on the upstream side 108 of the filter bank 100 remains more open on top of the filter bank 100 compared to the pleat 112 on the downstream side 110. As illustrated in FIG. 3A to 3B, in some embodiments, a single glue bead 106 is used on an air entering side (or upstream side 108) of the filter bank 100 as shown in FIG. 3A, which fills the bottom of the pleat (between adjacent filter-media packs in the filter bank) when the filter bank 100 is deployed. Further, two glue beads 106 are used on the air exiting side (or downstream side 110) of the filter bank 100 to seal the top and bottom of the pleat in the filter bank 100 as shown in FIG. 3C. The flexible material 104 may be attached to the connecting ends of the adjacent filter-media packs using heat-activated glue beads 106 and/or other adhesives provided at the edges of the filter-media pack 102. Further, the flexible material 104 may be porous to facilitate airflow through a region of the filter-media pack which is attached to the flexible material 104.

In other embodiments, edge-banding can be employed as the coupling element 104, where a strip of material similar to the flexible material 104 is applied right to the edge of the pleats 112, 114 of the filter-media packs 102 forming a frame on the corresponding ends. This frame of the edge-band material is generally a solid rectangle that covers the sides of the filter-media pack 102 (as in FIG. 3A) which then may be cut to open the tops of the pleat tips to allow air to flow into the filter-media packs 102. In another instance, this frame of edge-band material can have a geometry that substantially matches the pleat shape prior to application.

The edge-banding can be formed from a variety of sheet media. For example, the same filter-media pack material may be used, and/or as a nonwoven polyester, which may also comprise the material of the filter-media pack. The edge-banding preferably, however, is to be stronger than the filter-media pack. The sheet used for edge-banding can be breathable or porous, which further minimizes resistance to airflow therethrough. In this manner, the strips of edge-banding can assist in stabilizing and retaining the shape of the filter bank 100 while minimizing the pressure drop across the filter bank 100.

In yet another embodiment, the edge band material can be insert-molded with plastic or potted so that the corresponding edges are evenly sealed, however, it is not preferred since the edge-band part is generally large. Similarly, other types of coupling elements may also be used between adjacent filter-media packs 102 as long as the material used as the coupling element 104 closes only the bottom of the pleat pack 114 at the air exiting side 110, but, the pleat 112 on the air entering side 108 of the filter bank 100 remains more open on top of the filter bank 100 compared to the pleat 112 on the air exiting side 110 of the filter bank.

In a preferred embodiment, the edge glue beads 106 are used on the upstream side 108 of the filter-media packs 102 but only at a downstream edge of pleat between the adjacent filter-media packs on the upstream side 108 of the filter bank, to seal the two-adjacent filter-media packs. In addition, the edge glue beads 106 are used to close the pleat 114 between the adjacent filter-media packs on the downstream side 110 of the filter bank 100. However, a pleat tip 112 created between the adjacent filter-media packs on the upstream side 108 of the filter bank 100 is left open to allow air to pass into the corresponding filters-media packs 102. Later on, the strips of flexible material 104 are used to attach adjacent filter-media packs at the edge glue beads 106 so that the filter-media packs 102 remain foldable and sealed together. In addition, the flexible material 104 may be porous which allows airflow through a region of the filter-media packs covered by the flexible material 104. In an embodiment, the flexible material 104 may be a non-woven material that creates a low-pressure drop.

In some embodiments, each filter-media pack 102 may be a sheet or planar section that may be pleated or folded to further increase the surface area of the corresponding filter-media pack 102 as shown in FIG. 3B. The filter-media packs 102 of the filter bank 100 may be of fiberglass, micro-glass, or synthetic materials such as but not limited to polyester, polyethylene, polypropylene, or polytetrafluoroethylene. The filter-media pack 102 may be a HEPA filter, where the pleated or folded sheet of thin glass contains some level of activated-carbon-based material. Similarly, other types of filter-media packs may also be employed in the filter bank. Further, the filter-media packs 102 may be either pleated vertically or horizontally relative to the airflow. Alternatively, the filter media packs 102 may be non-pleated having flat planar media.

The individual pleated filter-media pack should not be confused with the pleated formation of the filter bank 100 in the deployed state. The individual pleated filter-media pack 102 is made of a sheet of a planar section that is folded. On the contrary, the deployed state of the filter bank 100 corresponds to a pleated formation of the plurality of filter-media packs 102-1 to 102-N, where two adjacent filter-media packs orient at a non-parallel angle forming the zig-zag arrangement of the filter-media packs. This pleated formation of the plurality of filter-media packs 102-1 to 102-N in the deployed state of the filter bank 100, along with the open pleat tip 112 on the upstream side 108 of the filter bank 100 provides a more open area on the air entering side of the filter bank 100 or filter assembly, which maximizes airflow into filters-media pack and also improves pressure drop.

Figure 5:
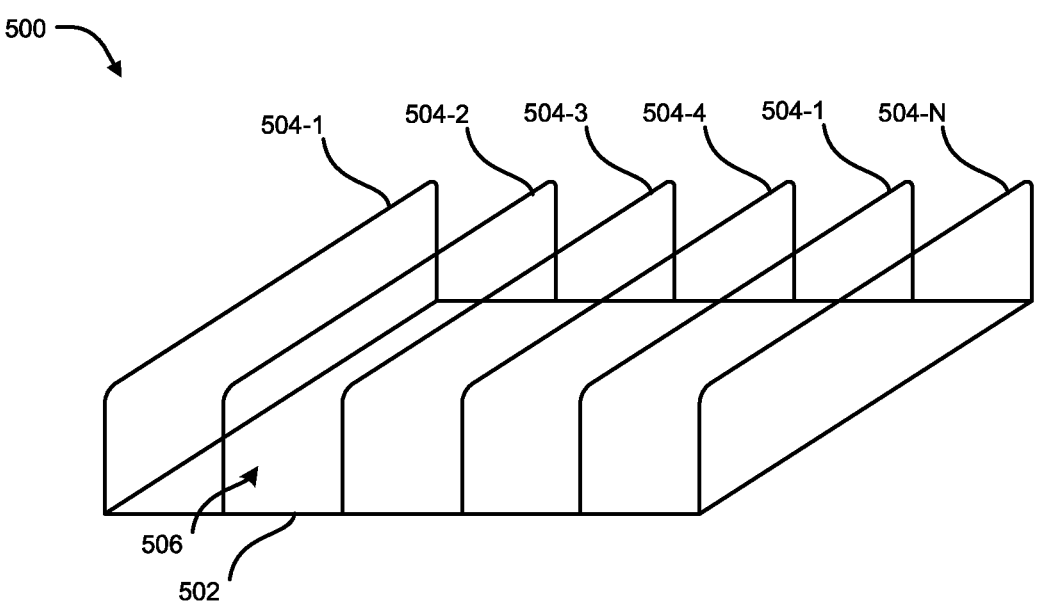
FIG. 5 illustrates an isometric view of the wired frame being used as a support structure for the filter bank in accordance with the invention.
Figure 6:
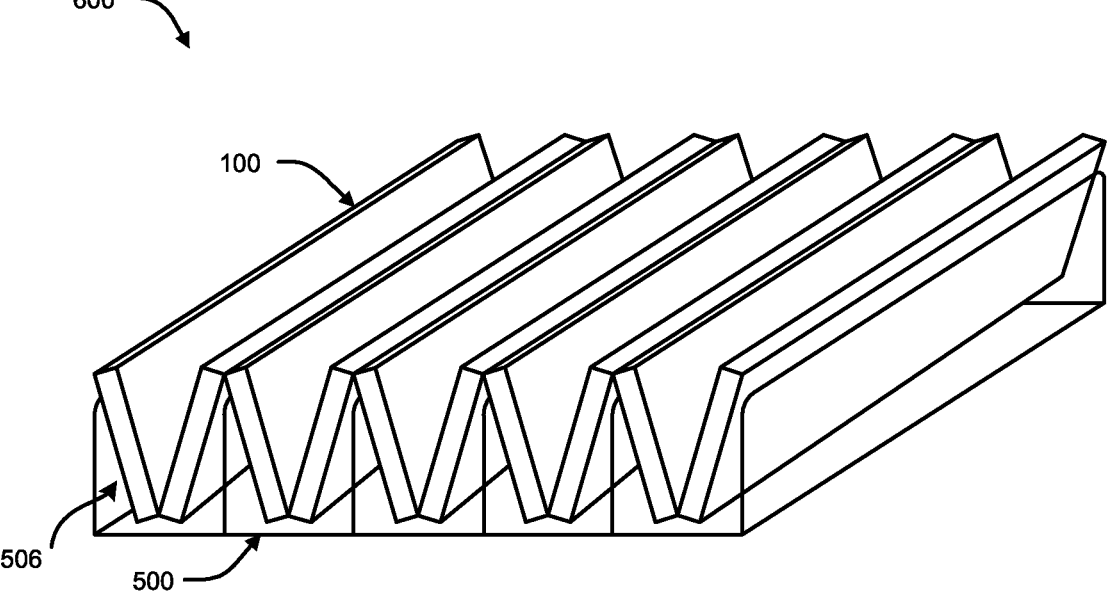
FIG. 6 is an isometric view of a filter system having the filter bank accommodated over the wired frame of FIG. 5 in accordance with the invention.

Referring to FIG. 5, a filter cabinet 500 for the filter assembly or filter bank 100 is illustrated. The filter cabinet 500 is adapted to accommodate and hold the filter assembly or filter bank 100 in the deployed state. The filter cabinet 500 includes a support structure (also designated as 500, herein) adapted to hold and support the filter bank 100 thereon. This support structure may be adapted to slide within a housing (not shown) of the filter cabinet to secure the filter bank or filter assembly 100 therewithin. In a preferred embodiment, the support structure 500 is a wired frame including a bottom 502 at an air exiting side of the filter assembly or filter bank 100, an open top at an air entering side of the filter assembly, and a set of partition walls 504-1 to 504-N (collectively referred to as partition walls 504, herein) extending perpendicularly from the bottom 502 of the wired frame such that one or more longitudinal compartments 506 are formed therebetween. As shown in FIG. 6, a filter system 600 having the filter bank 100 being secured over the support structure 500 is illustrated. The partition walls 504 of the support structure 500 are adapted to accommodate and engage with the coupling point between adjacent filter-media packs when the filter bank 100 is in the deployed state. Further, the compartments 506 formed in the support structure 500 are adapted to accommodate one of the V-shape oriented adjacent filter-media packs associated with the filter assembly when the filter bank 100 is in the deployed state. Thus, the partition walls 504 and compartments 506 of the support structure 500 keep the filter bank 100 in the deployed state. Moreover, the use of a wired frame for the support structure 500 allows air to easily flow through the filter bank without any obstructions, which generally happens with rigid frames.

The support structure 500 is not only limited to being a wired frame, but it may also be a non-wired frame (not shown) having a bottom with holes or cut sections at an air exiting side of the filter assembly or filter bank to allow air to pass through the bottom, an open top at an air entering side of the filter assembly, and a set of partition walls extending perpendicularly from the bottom of the wired frame such that one or more compartments are formed therebetween.

Figure 7:
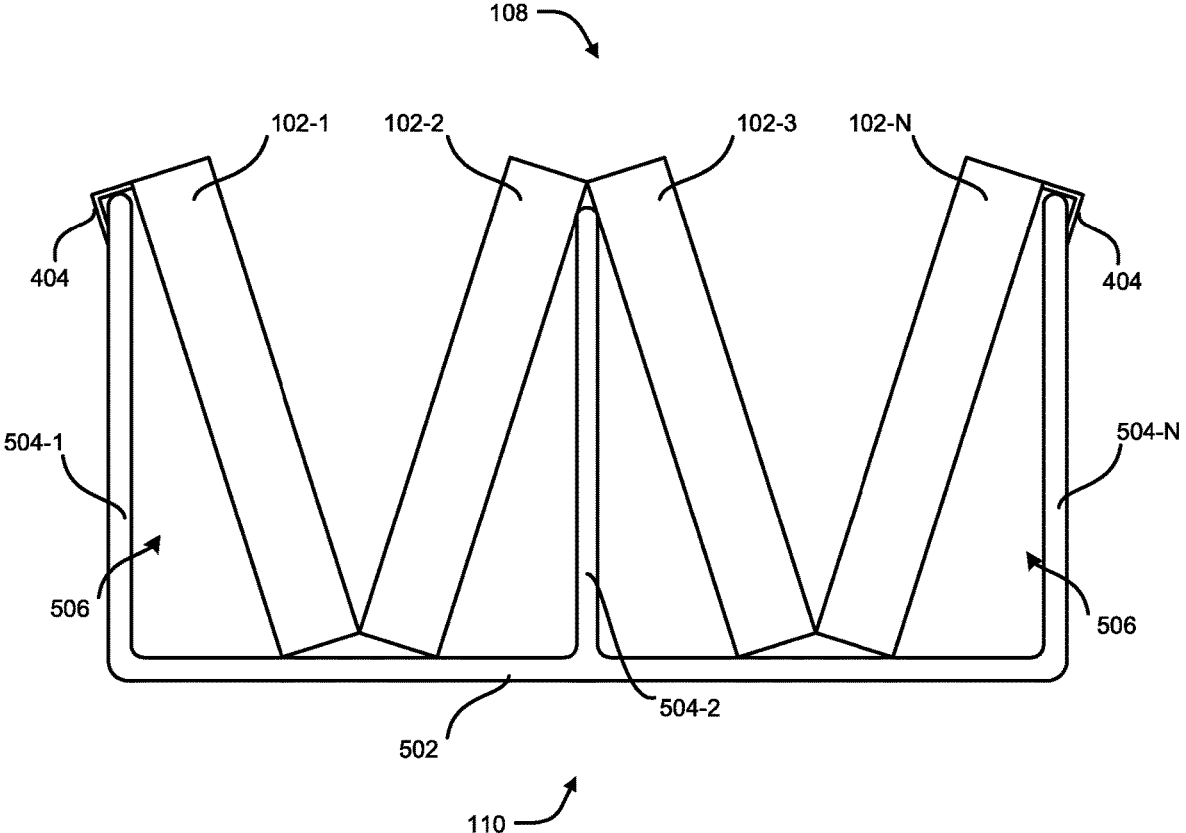
FIG. 7 is a schematic diagram illustrating another exemplary embodiment of the foldable filter bank having engaging elements, which helps secure the filter bank in the wired frame of FIG. 5 in accordance with the invention.

Referring to FIG. 7, filter bank 100 includes an engaging element 404 configured at both ends of filter bank 102. For instance, one engaging element 404 can be provided at the downstream side 110 of the filter-media pack 102-1 on the extreme left side of the filter bank 100 and one engaging element 404 can be provided at the downstream side 110 of the filter-media pack 102-N on the extreme right side of the filter bank 100. These engaging elements 400 can have a profile adapted to engage with extreme ends of the filter cabinet or to the partition walls 504-1, 504-N on extreme opposite ends of the support structure 500, which locks the filter bank 100 in the filter cabinet or over the support structure 500, thereby retaining the filter bank or filter assembly 100 in the deployed state. In some embodiments, the engaging element 404 may be a hook-shaped structure having one flat side attached at the free end on the second surface of the extreme left media pack 102-1 and/or extreme right media pack 102N of the filter bank 100. The engaging element 404 further includes a hook-shaped member protruding from the flat side, which is adapted to engage and lock with partition walls 504-1, 504-N on the extreme opposite ends of the support structure 500. Further, the engaging element 404 may also have any other shape as well, and all such embodiments are well within the scope of this invention.

The dimension of the support structure 500, including the width of the support structure 500, height of the partition walls 504, width of the compartments 506, and width of the partition walls 504 can be chosen based on the shape and size of the individual filter-media packs 102 as well as the overall size and shape of the filter bank 100 in the deployed state, such that the partition walls 504 can accommodate and engage with the coupling point between adjacent filter-media packs 102 on the downstream side 110 of the filter bank 100 and the compartments 506 can accommodate the V-shape oriented adjacent filter-media packs 102 and can also keep the adjacent filter-media packs 102 at a predefined non-parallel angle.

Figure 4:
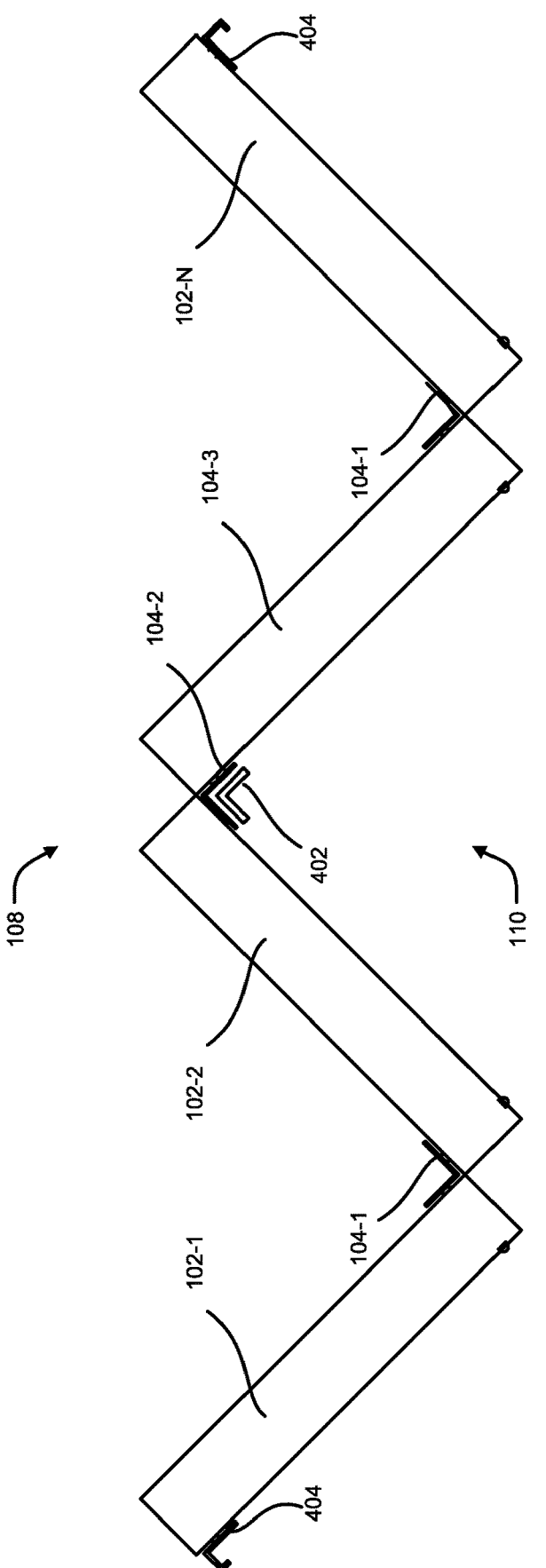
FIG. 4 is a schematic diagram illustrating another exemplary embodiment of the foldable filter bank in the deployed state, being fitted with a plastic extrusion as a retainer in accordance with the invention.

Referring to FIG. 4, in some embodiments, the filter assembly 100 includes a retainer 402 removably attached to the coupling elements 104-2, preferably on the downstream side 110 of the filter bank 100. Further, (not shown) retainers 402 can also be removably attached to the coupling elements 104-1, 104-N on the upstream side 108 of the filter bank 100. The retainers 402 are adapted to hold the two-adjacent filter-media packs 102 at the non-parallel angle in the deployed state and restrict movement of the filter bank beyond the deployed state. In addition, the engaging elements 404 on the extreme left and right filter-media packs 102-1, 102-N allows the filter assembly to be kept in the deployed state and allows the filter assembly 100 to be fitted in the housing of the filter cabinet without the requirement of the wired frame or support structure 500 of FIG. 5. Besides, as the retainer 402 is removably attached to the coupling elements 104 of the filter bank 100, the retainers 402 may be removed and the filter bank 100 may be folded back to the folded state when not in use or when required to be transported. Later on, the retainers 402 may again be attached to the coupling elements 104 to keep the filter bank 100 in the deployed state.

The retainer 402 may be a plastic extrusion or extrusion made of any other materials, which includes a first leg, and a second leg inclined at the non-planar angle with the first leg. For instance, the first leg of retainer 402 is attached to one of the two-adjacent filter-media packs 102-2 and the second leg of retainer 402 is attached to the other adjacent filter-media pack 102-3 on the downstream side 110 of the filter bank 100. In one embodiment, the first leg and the second leg of the retainer 402 make the non-parallel angle of 90 degrees such that the two-adjacent filter-media packs remain oriented in a V-shape arrangement.

In some embodiments, the filter bank or filter assembly 100 in the deployed state can be sealed within the filter cabinet using a sealing element that can be selected from a group comprising a filter media, an insulating material comprising polyester or fiberglass. In other embodiments, the filter bank 100 in the deployed state can also be sealed within the filter cabinet through a friction fit between the pleat tips 112, 114 of the filter bank 100 and an inner surface of the filter cabinet 500. In a preferred embodiment, the filter bank 100 is sealed in the housing of the filter cabinet 500 using the same filter media material or other insulating type of materials such as polyester or fiberglass (which may or may not be attached to the pleat sides) though a friction fit.

Figure 8:
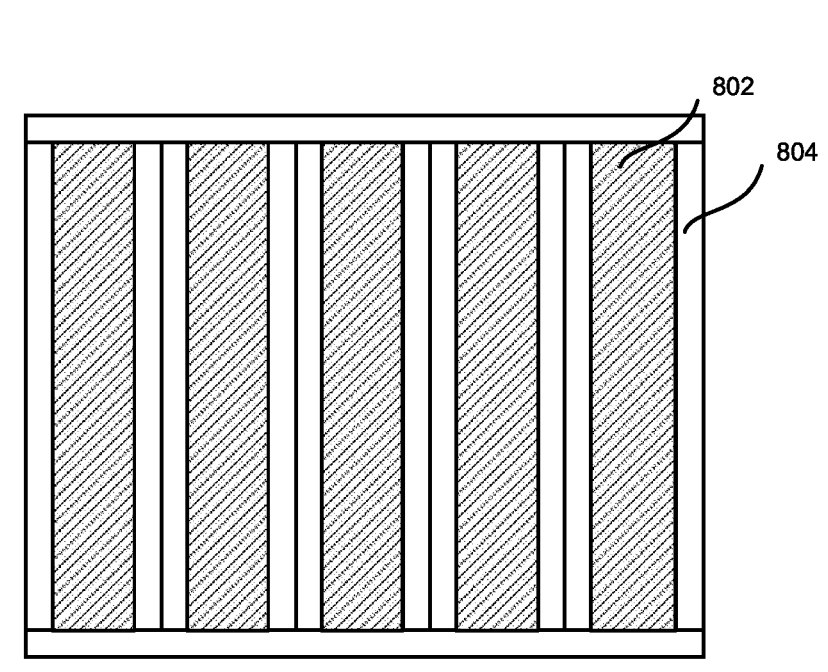
FIG. 8 is an air entering side view of an existing filter system having the existing filter bank secured in a rigid frame, which depicts the air inflow area highlighted by a hatched area.
Figure 9:
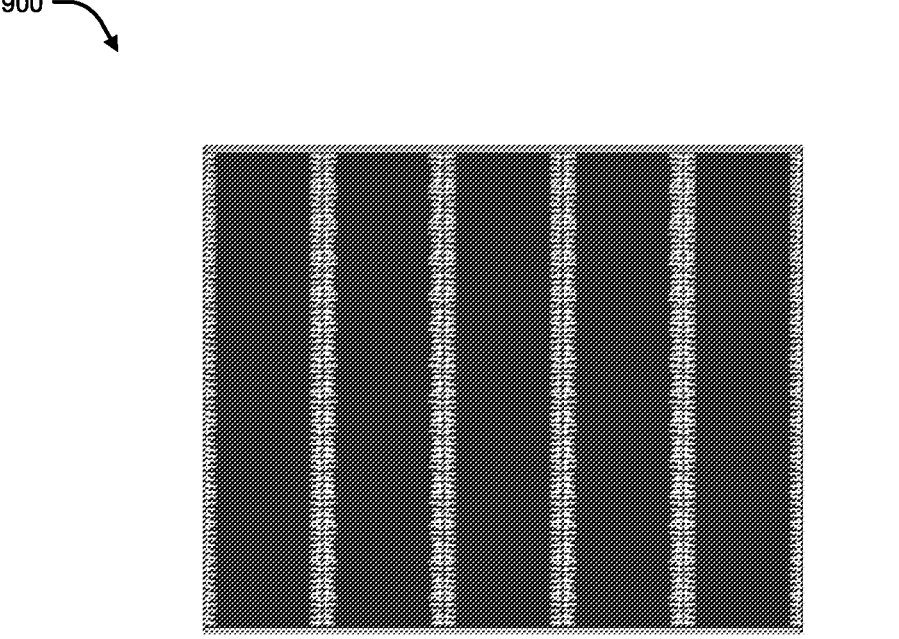
FIG. 9 is an air entering side view of this invention where the filter bank of FIG. 2 is secured in the wired frame of FIG. 5, which depicts the air inflow area by a black highlighted area.

Referring to FIG. 8, an air entering side view of the existing filter system 800 comprising the existing filter bank 802 secured in a rigid frame 804 is illustrated. As shown, a majority of the filter bank 802 at the air entering side remains covered by the rigid frame 804 (highlighted in white color), and only the rest hatched area (H) of the filter bank 802 allows air to flow through the filter system 800. Further, referring to FIG. 9, an air entering side view of this invention 900 comprising the filter bank 100 of FIG. 2 of this invention being secured in the wired frame or support structure 500 of FIG. 5 is illustrated. As shown, the air inflow area (highlighted in black) of this invention 900 allows air to pass through the filter bank with reduced pressure drop, and only a very limited area (highlighted in white) of this invention 900 restricts air to flow through the filter bank 100. This small white area of FIG. 9 corresponds to coupling elements 104, the wired frame of the support structure 500, and seal portions of pleats of the foldable filter bank 100. As can be inferred from FIGS. 8 and 9, it is to be appreciated by a person skilled in the art that this invention 900 provides more airflow area (around 48% more) at the air entering side of the filter bank compared to the existing filter system 800 of FIG. 8.

Thus, this invention maximizes airflow through the filter-media packs of the filter bank and improves filter pressure drop as well. Additionally, this invention works for various types of filter-media packs including HEPA filters and other filters as well.

While the invention has been described with reference to exemplary embodiments, it will be understood by those skilled in the art that various changes may be made and equivalents may be substituted for elements thereof without departing from the scope of the invention as defined by the appended claims. Modifications may be made to adopt a particular situation or material to the teachings of the invention without departing from the scope thereof. Therefore, it is intended that the invention not be limited to the particular embodiment disclosed, but that the invention includes all embodiments falling within the scope of the invention as defined by the appended claims.

In interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, the terms "comprises" and "consisting of" explicitly include embodiments which consist of or consist essentially of the expressed elements. Where the specification claims refer to at least one of something selected from the group consisting of A, B, C . . . and N, the text should be interpreted as requiring only one element from the group, not A plus N, or B plus N, etc.

The invention claimed is:

1. A foldable filter bank comprising:
 a plurality of filter-media packs, wherein adjacent filter-media packs among the plurality of filter-media packs are hingedly coupled to each other using at least one coupling element, wherein the filter bank has one or more of a deployed state, a folded state, and an extended state wherein,
 the at least one coupling element is configured such that a pleat between adjacent filter-media packs on an upstream side of the filter bank remains more open on top of the filter bank compared to a pleat on a downstream side.

2. The filter bank of claim 1, wherein during operation, the deployed state comprises two adjacent filter-media packs oriented at non-parallel angles.

3. The filter bank of claim 1, wherein the folded state comprises surfaces of two adjacent filter-media packs in contact, and wherein the extended state comprises the plurality of filter-media packs oriented coaxially with each other.

4. The filter bank of claim 1, wherein each of the filter-media packs comprises a first surface, and a second surface opposite to the first surface, wherein the first surface corresponds to the upstream side of the filter bank and the second surface corresponds to the downstream side of the filter bank, wherein the coupling elements are disposed of alternately on the upstream side and the downstream side of the filter bank, which results in the formation of non-parallel angles between adjacent filter-media packs when the filter bank is in a deployed state.

5. The filter bank of claim 4, wherein the coupling element on the upstream side is at least partially attached to the first surface on connecting ends of the corresponding adjacent filter-media packs, and wherein the coupling element on the downstream side is at least partially attached to the second surface on connecting ends of the corresponding adjacent filter-media packs.

6. The filter bank of claim 1, wherein each coupling element comprises a strip of flexible material, glue beads, edge bands, adhesive, or a combination thereof.

7. The filter bank of claim 6, wherein the flexible material is porous to facilitate airflow therethrough.

8. The filter bank of claim 6, wherein the glue beads are used at a downstream edge of the pleat between the adjacent filter-media packs on the upstream side of the filter bank, to seal the two-adjacent filter-media packs.

9. The filter bank of claim 6, wherein the glue beads are used to close the pleat between the adjacent filter-media packs on the downstream side of the filter bank, and wherein a pleat tip created between the adjacent filter-media packs on an upstream side of the filter bank is left open to allow air to pass into corresponding filter-media pack.

10. A filter assembly for a filter cabinet, the filter cabinet adapted to accommodate and hold the filter bank in a deployed state, the filter assembly comprising:

a foldable filter bank comprising a plurality of filter-media packs, wherein adjacent filter-media packs among the plurality of filter-media packs are hingedly coupled to each other using at least one coupling element, wherein the filter bank has one or more of a deployed state, a folded state, and an extended state, wherein, the at least one coupling element is configured such that a pleat between adjacent filter-media packs on an upstream side of the filter bank remains more open on top of the filter bank compared to a pleat on a downstream side, and wherein the deployed state corresponds to a pleated formation of the filter bank, in which adjacent filter-media packs orient at a non-parallel angle to form a zig-zag arrangement of the plurality of filter-media packs.

11. The filter assembly of claim 10, wherein the filter cabinet comprises a support structure adapted to hold and support the filter bank thereon, wherein the support structure is adapted to slide within a housing of the filter cabinet.

12. The filter assembly of claim 11, wherein the support structure is a wired frame comprising: a bottom at an air exiting side of the filter assembly, an open top at an air entering side of the filter assembly, and a set of partition walls extending perpendicularly from the bottom of the wired frame such that one or more compartments are formed therebetween.

13. The filter assembly of claim 12, wherein the set of partition walls associated with the support structure are adapted to accommodate and engage with the coupling point between adjacent filter-media packs when the filter bank is in the deployed state.

14. The filter assembly of claim 10, wherein the filter assembly comprises a retainer removably attached to the coupling elements on a downstream side of the filter bank, the retainer is adapted to hold the two-adjacent filter-media packs at the non-parallel angle in the deployed state and restrict movement of the filter bank beyond the deployed state.

15. The filter assembly of claim 14, wherein the retainer comprises a first leg, and a second leg inclined at the non-planar angle with the first leg, wherein the first leg is attached to one of the two-adjacent filter-media packs and the second leg is attached to the other adjacent filter-media pack.

16. The filter assembly of claim 15, wherein the retainer is a plastic extrusion having the first leg and the second leg making the non-parallel angle of 90 degrees such that the two-adjacent filter-media packs remain oriented in a V-shape arrangement.

17. The filter assembly of claim 10, wherein the filter bank comprises an engaging element configured at ends of the filter bank and adapted to engage with extreme ends of the filter cabinet, which locks the filter-media packs in the filter cabinet.

18. The filter assembly of claim 10, wherein the filter bank in the deployed state is sealed within the filter cabinet using a sealing element selected from a group comprising a filter media, and insulating material comprising polyester or fiberglass.

19. The filter assembly of claim 10, wherein the filter bank in the deployed state is sealed within the filter cabinet through a friction fit between pleat tips of the filter bank and an inner surface of the filter cabinet.

20. The foldable filter bank of claim 1, comprising one or more edge glue beads configured to close the pleat between the adjacent filter-media packs on the downstream side of the filter bank.

* * * * *